June 15, 1943.  B. K. HARTMAN  2,322,017
METHOD AND APPARATUS FOR TREATING INDUSTRIAL WASTES AND SEWAGE
Filed Oct. 16, 1941  3 Sheets-Sheet 1
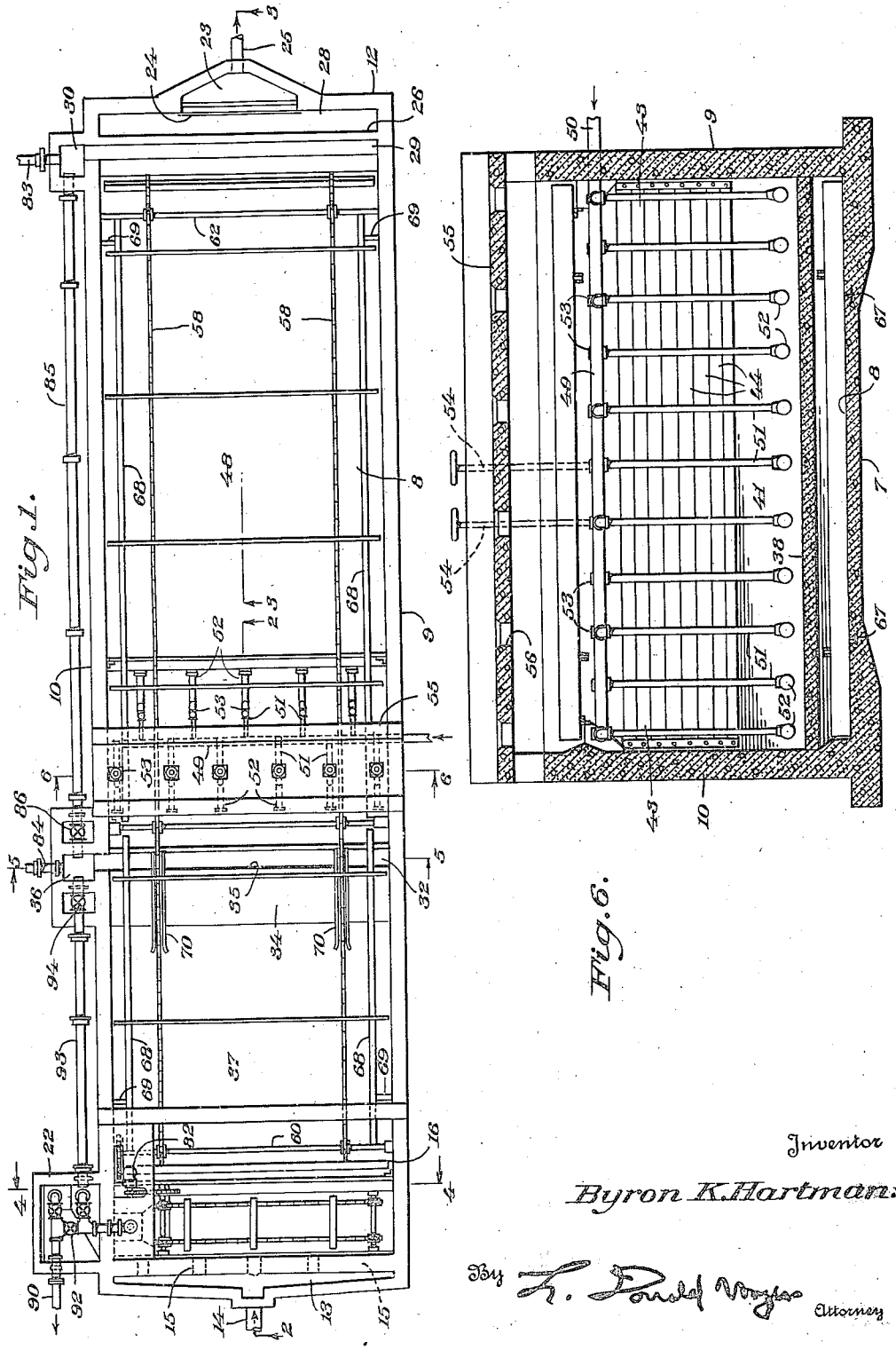
Inventor
Byron K. Hartman:
By ____ Attorney

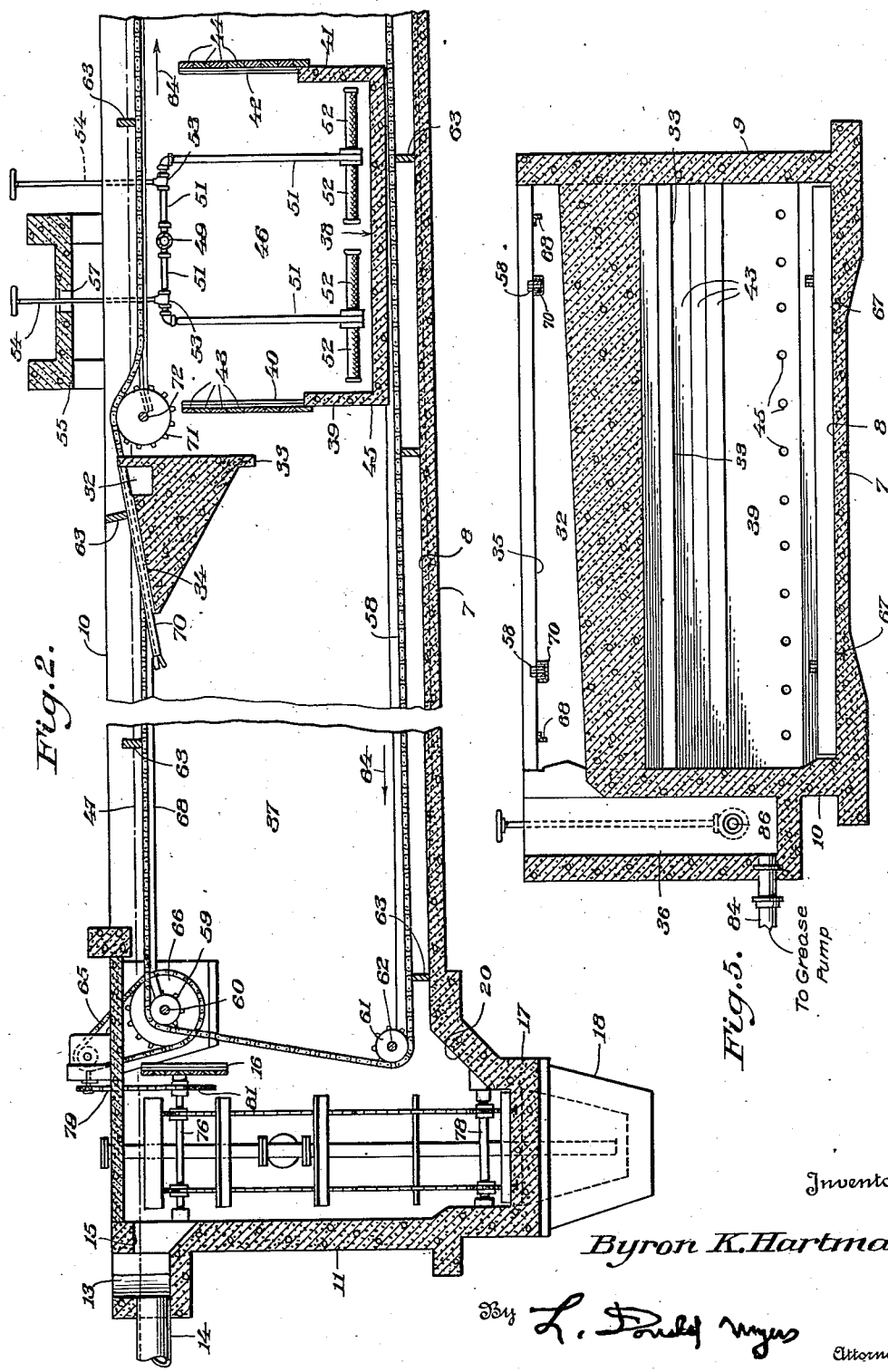

June 15, 1943.  B. K. HARTMAN  2,322,017
METHOD AND APPARATUS FOR TREATING INDUSTRIAL WASTES AND SEWAGE
Filed Oct. 16, 1941   3 Sheets-Sheet 3
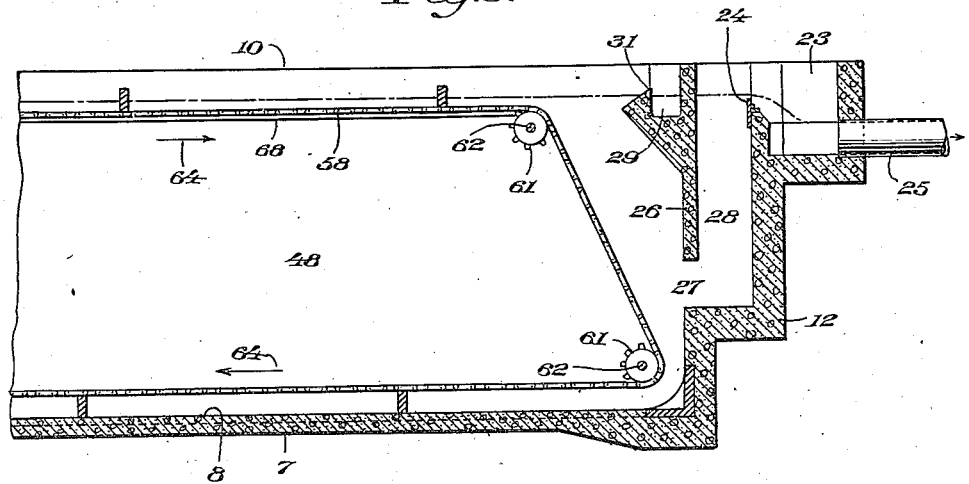
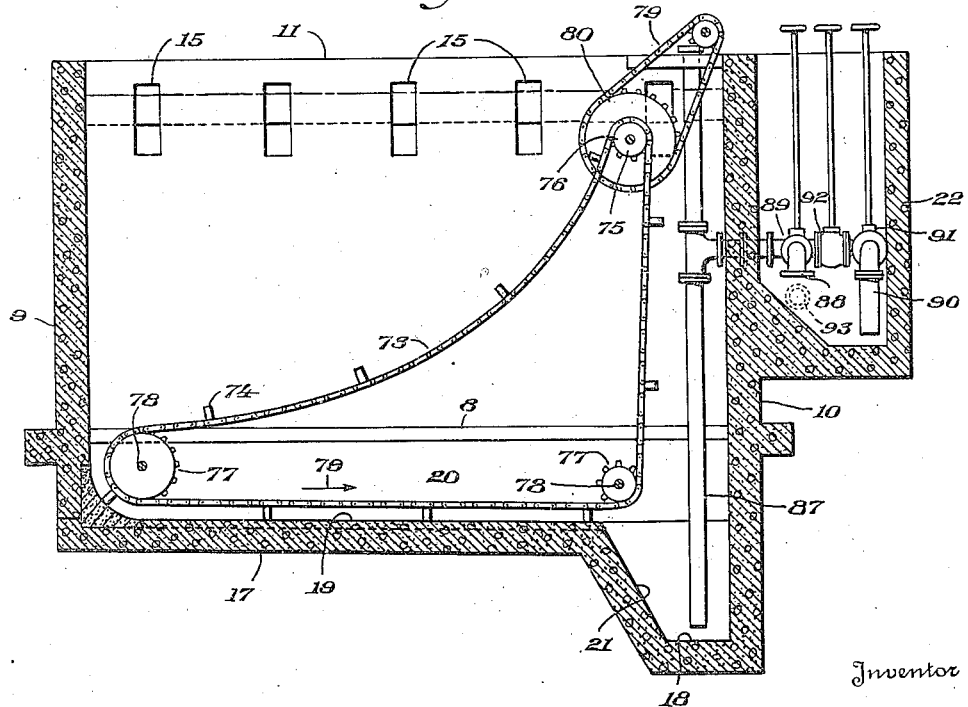
Inventor
Byron K. Hartman:
By L. Donald Myers
Attorney Patented June 15, 1943

2,322,017

UNITED STATES PATENT OFFICE 2,322,017

METHOD AND APPARATUS FOR TREATING INDUSTRIAL WASTES AND SEWAGE

Byron K. Hartman, Chicago, Ill., assignor to Link-Belt Company, a corporation of Illinois Application October 16, 1941, Serial No. 415,302

16 Claims. (Cl. 210—3)

This invention relates to a method and apparatus used in the primary treatment of industrial wastes and sewage and deals more particularly with the removal of grease and oil while the wastes or sewage are passing through a sedimentation tank for the removal of floatable and settleable solids.

It is the present practice to separate oil and grease from sewage or industrial wastes coming from packing houses, wool scouring plants, etc., by first aerating or agitating the liquid in one tank and then allowing the oil and grease to rise to the surface of a subsequent tank in which the retention period is such that a nearly quiescent condition exists.

It has been determined, however, that the large, heavy suspended solids are broken up by the agitation to which they are subjected with the result that it is difficult to settle them out when the wastes are subjected to sedimentaion.

The primary object of this invention is to provide a method and apparatus for effecting removal of the oil and grease as well as all floatable and settleable solids from industrial wastes and sewage by effecting pre-separation and collection of the large, heavy suspended solids and some scum, formed of oil, grease and floatable solids, then aerating or agitating the thus partially clarified liquid to effect separation of the remaining oil and grease, and then effecting separation of the remaining suspended solids and collection of these solids and the remaining scum which includes the oil and grease that was separated during the aeration or agitation step.

A still further important object of the invention is to effect the above noted treatment steps while the industrial wastes or sewage are flowing through a single sedimentation tank.

Another important object of the invention is to provide a single plain sedimentation tank which is divided into primary and secondary compartments, favoring settling of sludge and accumulation of scum on the surface of the liquid, by an aerating or agitating chamber which receives the partially clarified liquid from the primary compartment and delivers the aerated liquid to the secondary compartment.

Still another object of the invention is to provide the aforesaid single plain sedimentation tank with one collector mechanism which operates to collect and move to a point of removal the solids that settle out in both the primary and the secondary compartments and which additionally operates to collect and move to suitable removal points the scum, formed of oil, grease and floatable solids, which accumulates on the surface of the liquid in the said compartments.

Other objects and advantages of the invention will be apparent during the course of the following description.

In the accompanying drawings forming a part of this specification and in which like numerals are employed to designate like parts throughout the same, Figure 1 is a top plan view of the single sedimentation tank, and its associated mechanism, employed for carrying out the objects of this invention, Figure 2 is a partial, enlarged, vertical sectional view taken on line 2—2 of Fig. 1, Figure 3 is a partial, enlarged vertical sectional view taken on line 3—3 of Fig. 1 and disclosing the portion of the sedimentation tank omitted from Fig. 2, Figure 4 is a transverse, vertical sectional view taken on line 4—4 of Fig. 1, Figure 5 is a transverse, vertical sectional view taken on line 5—5 of Fig. 1, and Figure 6 is a transverse, vertical sectional view taken on line 6—6 of Fig. 1.

In the drawings, wherein for the purpose of illustration is shown the preferred embodiment of this invention, it will be noted that the several figures disclose a single plain sedimentation tank which is employed for the primary treatment of industrial wastes and sewage. The industrial wastes or sewage, as it reaches the disposal plant in its raw state, may be delivered directly to the treatment apparatus embodying this invention or, if found to be necessary, the raw wastes or sewage may first be passed through a grit chamber for the removal of grit and sand and then delivered to the apparatus of this invention. It is important to note, however, that it is not necessary or advisable to pass the raw wastes or sewage through aerating and/or skimming tanks prior to its delivery to the present sedimentation tank with its associated mechanisms. This is due to the fact that the single unit of this invention performs all of the steps which are necessary to bring about complete removal of the sludge and scum even though the scum may contain an excessive amount of oil and grease.

Referring first to all of the figures of the drawings, it will be seen that the main body of the tank is formed by the bottom wall 7, which provides the floor 8 of the tank, side walls 9 and 10, an influent end wall 11, and an effluent end wall 12. While the area defined by these side and end walls is of rectangular formation in plan, it will be appreciated that the respective side and end walls could be proportioned so as to define a square treatment area if desired. Additionally, it will be appreciated as the description proceeds that the straight-line flow type of operations performed by the illustrated apparatus could just as well be performed in a tank of circular formation with appropriate sludge and scum collecting mechanism associated therewith.

Referring next specifically to Figs. 1, 3 and 4, it will be seen that the influent end of the tank is provided with an influent channel 13 to which the industrial wastes or sewage are delivered by the pipe 14. This influent channel 13 is specifically illustrated as projecting beyond the end wall 11 of the main body of the tank and as extending throughout the width of the tank. Communication is established between the influent channel 13 and the interior of the tank by means of the several openings 15. The spaced arrangement of these openings operates to distribute the raw wastes or sewage throughout the width of the tank interior. A transversely arranged baffle plate 16 further assists in distributing the flow throughout the cross section of the tank.

The above noted figures further illustrate the influent end of the tank as being provided with a sump 17 which extends transversely of the tank and terminates at one end in a hopper 18. A sloping floor or bottom wall 19 may be provided in the sump 17 if desired. Sloping surfaces 20 and 21 are formed between the tank floor 8 and the sump floor 19 as well as between the end of the sump floor and the bottom of the hopper 18 to facilitate the movement of the sludge which is first received in the sump and is then delivered to the hopper.

Figs. 1 and 4 further disclose the influent end of the tank body is being provided with a side chamber 22 which is intended to receive the sludge from the hopper 18. As will be explained at a later point, this chamber 22, also, may function to receive the collected scum.

Figs. 1 and 3 disclose the effluent end of the tank body as being provided with an effluent channel 23. An overflow weir 24 is provided at the entrance to the effluent channel 23 and functions to regulate the liquid level in the interior of the tank. A pipe 25 communicates with the effluent channel 23 for carrying off the clarified liquid.

The effluent end wall 12 of the tank body is stepped and cooperates with a baffle 26, that operates as an underflow weir, to provide a submerged inlet opening 27 and a riser 28 for the clarified liquid flowing to the effluent channel 23. This inlet opening 27 and the riser 28 extend the full width of the tank. As a result of this construction, no scum is permitted to leave the tank with the effluent.

Figs. 1 and 3 disclose the effluent baffle 26 as having suitably associated therewith a scum trough 29 which extends the full width of the tank body. The bottom of this trough slopes transversely of the tank and empties at its lower end into an enlargement or hopper 30. The approach or upstream side of the scum trough 29 is formed into a weir 31 over which the scum flows to the trough.

Figs. 1, 2 and 5 disclose a second scum trough 32 which extends transversely of and the full width of the tank interior. This scum trough 32 is formed as a part of a structural unit which also performs the function of an underflow weir 33 and which additionally provides an inclined deck 34 on the approach or upstream side of the trough. The higher edge 35 of this deck 34 acts as a weir for the trough 32. Fig. 5 discloses the floor or bottom of this scum trough as sloping transversely of the tank to empty into a sump or hopper 36.

The structural formation that provides the scum trough 32 and the underflow weir 33 also functions in part to define the effluent end of an initial or primary sedimentation compartment 37. The dimensions of this initial or primary compartment bear a proper relationship with respect to the volume and rate of flow therethrough to provide a retention period which will permit settling out of the large, heavy suspended solids. This pre-settling retention period, naturally, will allow some scum to accumulate on the surface of the liquid. This scum will consist of some oil and grease and most of if not all of the floatable suspended solids. As the description proceeds, it will be seen that the sludge formed in this initial or primary compartment 37 is moved directly into the sump 17 while the scum is collected and skimmed into the trough 32. The inclined deck 34 assists in this skimming of the scum. The underflow weir 33, which is formed as a part of this baffle structure, prevents scum which has separated out in the initial primary compartment from leaving with the effluent of this compartment.

Immediately downstream of the initial or primary sedimentation compartment 37 there is provided an intermediate compartment or chamber in which the effluent or supernatant liquid from the initial or primary sedimentation compartment is aerated or agitated to bring about separation of the remaining oil and grease. The construction of this intermediate chamber or compartment is best disclosed in Figs. 1, 2 and 6. It extends the full width of the tank interior and is defined by a bottom wall 38, which is elevated with respect to the floor 8 of the tank body, an upstream wall which is formed in part by the permanent portion 39 and in part by the adjustable baffle 40 which also functions as an overflow weir, and a downstream wall which is formed in part by the permanent portion 41 and the adjustable baffle 42 which also acts as an overflow weir. The adjustability of the baffles or weirs 40 and 42 results from the formation of these elements by means of detachable slats 43 and 44 respectively. In other words, the heights of these baffles or weirs may be varied or adjusted by adding or taking away desired numbers of slats 43 or 44. A suitable number of drain holes 45 are formed in the permanent portion 39 of the upstream wall. It will be appreciated by inspecting Figs. 2 and 6 that this intermediate chamber or compartment 46 is provided with an open top which is submerged with respect to the liquid level 47 in the tank. Therefore, the effluent or supernatant liquid from the initial or primary compartment 37 flows into this intermediate chamber or compartment 46 by passing under the weir 33 and over the weir 40. After the liquid is properly aerated or agitated in this intermediate chamber or compartment 46 it leaves the same by passing over the weir 42 so as to enter a secondary or final sedimentation compartment 48. The dimensions of this final secondary compartment bear such a relationship to the volume and velocity of flow therethrough as to provide a retention period in which all of the remaining suspended solids will settle out and in which all of the remaining scum will accumulate on the surface of the liquid. This remaining scum will consist of the oil and grease which has been separated from the liquid in the intermediate chamber or compartment 46 and is permitted to rise to the surface of the liquid in the final or secondary compartment 48. Of course, any floatable solids remaining in the liquid entering the final or secondary compartment 48 will be permitted to rise to the surface of the liquid and will be collected with the other floatable materials in the scum trough 29.

Although other forms of diffused air, mechanical or combined diffused air and mechanical aerator mechanism may be employed in the intermediate chamber or compartment 46 for aerating or agitating the liquid as it passes therethrough, the specific form of mechanism disclosed in Figs. 1, 2 and 6 has been found to be most desirable. This mechanism is of the diffused air type and includes a header 49 which is supplied with the desired volume of properly compressed air by the pipe line 50 that extends outwardly of the tank through the side wall 9. A suitable number of branch lines 51 extend laterally of opposite sides of the header 49, and in staggered relation, to supply the several pairs of porous diffuser tubes 52 which are arranged in a common horizontal plane properly elevated with respect to the floor or bottom 38 of the chamber 46. A suitable control valve 53 is provided in each branch line 51. These valves are manually controlled or operated by means of removable extension valve rods 54. These operating rods may be socketed at their lower ends in any desired way to properly cooperate with the valves and suitable hand wheels or the like may be formed on their upper ends. To facilitate this manipulation of the several valves 53, a platform 55 extends across the top of the tank. This platform overlies one transversely aligned set of valves 53 and for that reason the floor of the platform is provided with openings 56 to accommodate the valve operating rods 54 when it becomes necessary to adjust these valves. The other transversely aligned set of valves 53 is arranged at one side of the platform 55 and can be reached without difficulty.

It will be noted that this platform 55 is located sufficiently close to the scum trough 32, and its inclined deck 34, to permit an attendant to stand on the same to effect or assist in effecting skimming of the scum into the trough 32.

There has thus far been disclosed the single sedimentation tank with its properly spaced influent and effluent, the initial or primary sedimentation compartment in which presettling of sludge and pre-separation of scum takes place, a scum removal trough for this initial or primary compartment, an intermediate chamber or compartment in which the partially clarified liquid is aerated or agitated to effect separation of the remaining oil and grease, a final or secondary sedimentation compartment in which the remaining suspended solids settle as sludge to the bottom of the tank and the remaining scum rises to the surface of the liquid, and a scum draw-off trough for this final or secondary compartment. It now becomes necessary to disclose the collector mechanism which is employed for handling the settled sludge and the accumulated scum.

Figs. 1, 2 and 3 best illustrate the principal collector mechanism. It consists of an endless flight conveyor which includes the two conveyor chains 58 which are trained over the sprockets 59 carried by the driver shaft 60 and the several sprockets 61 carried by the idler shafts 62. These various sets of sprockets and shafts define or locate the four corners or bends of the conveyor path and particularly the upper and lower runs for the conveyor. Flights 63 are connected to the parallel chains 58 at uniform intervals with the spacing being less than the length of the chamber or compartment 46. The conveyor is caused to travel in the direction of the arrows 64 in Figs. 2 and 3 by the motor driven driver chain 65 which is trained over a sprocket 66 keyed to the driver shaft 60. This direction of movement of the conveyor causes the flights 63 to travel along and scrape the floor 8 of the tank from the effluent end to the sediment collecting sump 17 at the influent end. These flights of the lower conveyor run, therefore, will collect all of the sludge that has settled in both of the compartments 37 and 48 and convey it to the sump 17. It will be noted that this lower run of the conveyor passes beneath the bottom or floor 38 of the intermediate, aerating chamber or compartment 46. As there will always be a flight 63 located between the bottom 38, of the chamber or compartment 46, and the tank floor 8, the flights will prevent short-circuiting of the fluid between the compartments 37 and 48. Because the bottom of this chamber or compartment is solid or imperforate, the sludge is not permitted to go back into suspension as it is moved past the intermediate chamber.

The direction of travel of the upper run of flights is such that all of the scum which is accumulated at the surface of the liquid in the two compartments 37 and 48 is collected and moved to the two scum troughs 32 and 29. The flights 63 of this upper run are caused to travel up the inclined deck 34 and, in so doing, will effectively skim the scum into the trough 32. The scum collected by the upper run of the conveyor in the final or secondary compartment 48 will be delivered to the scum trough 29 for this compartment. This delivered scum will either be permitted to flow into the trough 29 as a result of the construction of the weir 31 or suitable means may be employed for skimming the scum into this trough. This skimming means may be any one of the well known mechanical devices or even manual skimming may be resorted to. If manual skimming is to be employed, a suitable grating or platform may be built over the effluent end portion of the tank to accommodate an attendant.

To properly support the lower run of the conveyor, tracks 67 are embedded in the bottom 7 of the tank. To properly support the upper run of the collector conveyor, angle tracks 68 are provided and are supported by suitable brackets 69 from the side walls of the tank. These tracks support the upper run of the conveyor so that the chains 58 are positioned a suitable distance below the liquid level 47 and so that the flights 63 are positioned both above and below this level.

To facilitate the passage of the upper run of the collector conveyor along the inclined deck 34 and over the scum trough 32, channel guides 70 are associated with the deck 34 and receive the conveyor chains 58 while an extra pair of idler sprockets 71, carried by an idler shaft 72, are also provided. It will be noted that these channel guides 70 and the sprockets 71 result in carrying the conveyor chains and their flights entirely above the liquid level 47 in the vicinity of the scum trough 32.

The present embodiment of the invention discloses a cross collector associated with the sludge sump 17. Such a collector is necessary for the larger sized tanks to effect delivery of the sludge to the hopper 18. In smaller tanks, this cross collector may be dispensed with by employing two or more hoppers.

This cross collector is best illustrated in Figs. 1, 2 and 4. It consists of an endless flight conveyor that includes the parallel chains 73 and the properly spaced flights 74. The chains are trained over the driver sprockets 75, carried by the drive shaft 76, and the idler sprockets 77 carried by the idler shafts 78. The conveyor travels in the direction of the arrow 79 in Fig. 4.

The driver shaft 76 for the cross collector conveyor is motor driven by means of the chain 79 which is trained over the driver sprocket 80 keyed to the shaft 76.

Figs. 1 and 2 disclose a single motor 82 for driving both of the sprockets 65 and 79 for the two collector conveyors.

There has thus far been disclosed mechanism for collecting the scum in the two troughs 29 and 32 and for collecting the sludge in the hopper 18. Final disposal of the scum and sludge may be accomplished with the following mechanism.

Fig. 1 discloses a pipe 83 which communicates with the scum sump or chamber 30 which is provided for the trough 29. This pipe 83 may be employed for connecting the sump or hopper 30 to a suitable grease pump, or the like, which will deliver the scum to suitable additional disposal mechanism. Figs. 1 and 5 disclose the scum sump or hopper 36 as having a pipe 84 communicating therewith which may be employed for delivering the scum to a suitable grease pump, or the like, for handling by additional disposal mechanism. If it is desired to intermix or bring together the scum collected in the two troughs 29 and 32, a suitable pipe 85 may be provided and arranged for connecting the sump or hopper 30 to the sump or hopper 36. A control valve 86 may be provided for controlling this mixing of the separately collected scum.

Figs. 1, 2 and 4 disclose a sludge pipe 87 which extends into the sludge hopper 18. This pipe is employed for transferring the sludge from the hopper to the sump or chamber 22 into which it is emptied by the extension 88 of the sludge pipe. A suitable valve 89 effects control of this delivery of sludge. A pipe 90 extends from the sump or chamber 22 to a suitable sludge pump. The inner end of this pipe 90 dips into the bottom of the sump or chamber 22 for picking up the sludge delivered to the latter. A valve 91 is employed for controlling this withdrawal of sludge. The sludge pipe 87 and the pipe 90, leading to a sludge pump, may be placed in direct communication by means of the control valve 92. In other words, the sludge may be withdrawn from the hopper 18 and conducted directly to a sludge pump without first being emptied into the sump or chamber 22. To accomplish this disposal of the sludge, it is necessary, of course, to first close both of the valves 89 and 91.

If it is desirable to mix or bring together a part or all of the collected scum and the sludge, a pipe 93 may be provided. This pipe extends from the sump or hopper 36 to the sump or chamber 22. Flow through this pipe is controlled by the valve 94.

If it is deemed to be advisable to separately handle the sludge collected in the two compartments 37 and 48, an additional sludge sump and hopper arrangement may be built into the bottom 7 of the tank in the vicinity of the aeration chamber or compartment 46. That is to say, this additional sludge sump and hopper may be located either beneath the bottom 38 of the chamber or compartment 46 or it may be located immediately adjacent the downstream side of this chamber or compartment. A sludge collecting sump or hopper located at either of these points would receive the sludge settled out of the liquid in the final or secondary compartment as the lower run of the collector conveyor passed thereover. By extending the bottom tracks 67 across the open top of this additional sump and hopper, the conveyor would be compelled to travel its illustrated straight line path.

If some form of mechanical agitation is employed in chamber or compartment 46 which does not disturb the surface of the liquid too much, the scum trough 32 may be eliminated and all of the scum then will be carried over to the final trough 29.

It is to be understood that the form of the invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. The method of treating industrial wastes or sewage which comprises flowing wastes or sewage through a primary sedimentation zone providing a retention period in which the large heavy suspended solids are allowed to settle out and floatable solids with some oil and grease are allowed to rise to the surface of the liquid, collecting the floating material from the surface of the liquid for removal from the said zone, aerating only the effluent from said primary zone to effect separation of the remaining oil and grease, flowing the aerated liquid with its separated oil and grease through a secondary sedimentation zone providing a retention period in which the remaining suspended solids are allowed to settle out and the separated oil and grease with any remaining floatable solids are allowed to rise to the surface of the liquid, collecting the floating material from the surface of the liquid for removal from the secondary zone, and collecting and removing as one continuous operation the settled out solids from both the primary and secondary zones.

2. The method of treating industrial wastes or sewage which comprises introducing raw wastes or sewage as the influent of a primary sedimentation zone providing a retention period in which the large heavy suspended solids are allowed to settle out and floatable solids with some oil and grease are allowed to rise to the surface of the liquid, flowing the only partially clarified effluent of said primary zone through an intermediate zone in which it is aerated to effect separation of the remaining oil and grease, flowing the effluent of the intermediate zone with its separated oil and grease through a secondary sedimentation zone providing a retention period in which the remaining suspended solids are allowed to settle out and the separated oil and grease with any remaining flotable solids are allowed to rise to the surface of the liquid, withdrawing the effluent from the secondary zone, collecting the material floating on the surface of the liquid in the primary and secondary zones and conveying it to a point of withdrawal adjacent the effluent of each zone, and collecting the settled out solids from both the primary and secondary zones and conveying it to a point of withdrawal adjacent the influent of the primary zone.

3. The method of treating industrial wastes or sewage which comprises flowing wastes or sewage through a single, continuous sedimentation chamber, settling out the large heavy suspended solids and accumulating on the surface of the liquid floatable solids with some oil and grease as the wastes or sewage pass through the initial zone of the chamber, collecting and withdrawing from the chamber the floatable solids accumulated in the initial zone along with the oil and grease, aerating the thus partially clarified effluent of the initial zone as it passes through the intermediate zone of the chamber to effect separation of the oil and grease, settling out the remaining suspended solids remaining in the partially clarified wastes or sewage and accumulating on the surface of the liquid the oil and grease that are separated in the intermediate zone and any remaining floatable solids as the wastes or sewage pass through the final zone of the chamber, collecting and withdrawing the oil, grease and floatable solids accumulated in the final zone of the chamber, and collecting in one continuous operation the settled out suspended solids from substantially the entire lengths of both the initial and final zones and conveying them to a place of withdrawal from the chamber which is located adjacent the point of introduction of the wastes or sewage to the chamber.

4. Apparatus for the treatment of industrial wastes or sewage comprising a sedimentation tank having an influent and an effluent spaced from each other by substantially the full length of said tank so that the wastes or sewage, in flowing from one to the other, will be subjected to the desired retention period, means for forming an aerating chamber in the intermediate portion of the tank at a location which is spaced from the influent a suitable distance to leave an initial sedimentation compartment and which is spaced from the effluent a suitable distance to leave a final sedimentation compartment, means in the aerating chamber for agitating and aerating the partially clarified liquid, admitted thereto from the said initial compartment, to effect separation of oil and grease, a scum outlet for the initial compartment located adjacent the aerating chamber, a scum outlet for the final compartment located adjacent the effluent of the tank, sludge discharge means for the entire tank located adjacent the influent, and a single endless conveyor collector mechanism having its upper run arranged for moving the scum in both of the compartments to their respective outlets and having its lower run arranged for moving the sludge in both of the compartments to the said discharge means.

5. Apparatus for the treatment of industrial wastes or sewage comprising a sedimentation tank having an influent and an effluent, means for forming an aerating chamber in the tank at a location which is spaced from both the influent and the effluent, means in the aerating chamber for agitating and aerating the partially clarified liquid admitted thereto to effect separation of oil and grease, a scum outlet for the initial compartment, a scum outlet for the final compartment, sludge discharge means for the entire tank, and an endless flight conveyor having its upper run arranged relative to the liquid level in the tank and its lower run arranged relative to the bottom of the tank for collecting the scum and sludge from both of the compartments and moving the same to their respective scum outlets and the sludge discharge means for the entire tank.

6. Apparatus for the treatment of industrial wastes or sewage comprising a sedimentation tank having an influent and an effluent, a weir at the effluent controlling the liquid level in the entire tank, a chamber formed in the intermediate portion of the tank and having an open top terminating below the liquid level of the tank, means for aerating the wastes or sewage as they pass through the said chamber to effect separation of oil and grease, and means for collecting and removing the floatable and settleable materials which separate out in the portions of the tank located on opposite sides of the aforesaid chamber.

7. Apparatus for the treatment of industrial wastes or sewage comprising a sedimentation tank having an influent and an effluent, a chamber formed in the intermediate portion of the tank and having an open top terminating below the liquid level of the tank, said chamber being formed by a pair of spaced baffles extending across the width of the tank and a bottom wall elevated from the floor of the tank, means for aerating the wastes or sewage as they pass through the said chamber to effect separation of oil and grease, and means for collecting and removing the floatable and settleable materials which separate out in the portions of the tank located on opposite sides of the aforesaid chamber.

8. Apparatus for the treatment of industrial wastes or sewage comprising a sedimentation tank having an influent and an effluent spaced from each other so that the wastes or sewage, in flowing from one to the other, will be subjected to the desired retention period, means for forming an aerating chamber in the tank at a location which is spaced from the effluent a suitable distance to leave an initial sedimentation compartment and which is spaced from the effluent a suitable distance to leave a final sedimentation compartment, said aerating chamber forming means consisting of a pair of spaced baffles adjustable in height and extending across the width of the tank with a bottom wall elevated from the floor of the tank, means in the aerating chamber for agitating the partially clarified liquid, admitted thereto from the said initial compartment, to effect separation of oil and grease, a scum outlet for the initial compartment located adjacent the aerating chamber, a scum outlet for the final compartment located adjacent the effluent of the tank, sludge discharge means for the entire tank located adjacent the influent, and a single endless flight conveyor collector device having its upper run arranged for moving the scum in both of the compartments to their respective outlets and having its lower run arranged for moving the sludge in both of the compartments to the said discharge means.

9. Apparatus for the treatment of industrial wastes or sewage comprising a single, straight-line flow sedimentation tank having an influent at one end and an effluent at the other end, means for forming an aerating chamber in the intermediate portion of the tank so as to be spaced from both the influent and the effluent, said aerating chamber forming means consisting of a pair of spaced baffles adjustable in height and extending across the width of the tank with a bottom wall elevated from the floor of the tank, means in the aerating chamber for agitating and aerating the partially clarified liquid admitted thereto to effect separation of oil and grease, a scum outlet at the down-stream end of the initial compartment, a scum outlet at the down-stream end of the final compartment, sludge discharge means for the entire tank, and means for collecting the scum and sludge from both of the compartments and moving the same to their respective outlets and discharge means.

10. Apparatus for the treatment of industrial wastes or sewage comprising a sedimentation tank having an influent and an effluent, a chamber formed in the intermediate portion of the tank and having an open top terminating below the liquid level of the tank, said chamber being formed by a pair of spaced baffles extending across the width of the tank and a bottom wall elevated from the floor of the tank, means for aerating the wastes or sewage as they pass through the said chamber to effect separation of oil and grease, a scum receiving trough in each of the portions of the tank located on opposite sides of the aforesaid chamber, a sludge receiving sump in the tank adjacent its influent, and an endless flight conveyor arranged in the tank so that its flights in the lower run will travel the length of the floor of the tank to collect the sludge and move it into the sludge sump and its flights in the upper run will travel along the surface of the liquid to collect and deliver the scum to the respective scum troughs.

11. Apparatus for the treatment of industrial wastes or sewage comprising a sedimentation tank having an influent and an effluent, a chamber formed in the intermediate portion of the tank and having an open top terminating below the liquid level of the tank, said chamber being formed by a pair of spaced baffles extending across the width of the tank and a bottom wall elevated from the floor of the tank, means for aerating the wastes or sewage as they pass through the said chamber to effect separation of oil and grease, a scum receiving trough in the portion of the tank extending between the tank influent and the aforesaid chamber and having an inclined deck on its upstream side, a scum receiving trough in the portion of the tank extending between the aforesaid chamber and the tank effluent, a sludge receiving sump in the tank adjacent its influent, and an endless flight conveyor arranged in the tank so that its flights in the lower run will travel the length of the tank floor, passing beneath the said chamber, to collect the sludge and move it into the sludge sump and its flights in the upper run will travel along the surface of the liquid, passing up the inclined deck and over its associated scum trough, to collect and deliver the scum to the said troughs.

12. Apparatus for the treatment of industrial wastes or sewage comprising a sedimentation tank having an influent and an effluent, a chamber formed in the intermediate portion of the tank and having an open top terminating below the liquid level of the tank, said chamber being formed by a pair of spaced baffles extending across the width of the tank and a bottom wall elevated from the floor of the tank, means for aerating the wastes or sewage as they pass through the said chamber to effect separation of oil and grease, a scum receiving trough in each of the portions of the tank located on opposite sides of the aforesaid chamber, a sludge receiving sump extending across the tank adjacent its influent and having a hopper at one end, a collector operatively associated with the sump for moving the sludge into the hopper, and an endless flight conveyor arranged in the tank so that its flights in the lower run will travel the length of the floor of the tank to collect the sludge and move it into the sludge sump and its flights in the upper run will travel along the surface of the liquid to collect and deliver the scum to the respective scum troughs.

13. Apparatus of the type described comprising a sedimentation tank having an influent and an effluent, a chamber formed in the intermediate portion of the tank and having an open top terminating below the liquid level of the tank, said chamber being formed by a pair of spaced baffles extending across the width of the tank and a bottom wall elevated from the floor of the tank, means for aerating the wastes or sewage as they pass through the said chamber to effect separation of oil and grease, a scum receiving trough in the portion of the tank extending between the tank influent and the aforesaid chamber and having an inclined deck on its upstream side, a scum receiving trough in the portion of the tank extending between the aforesaid chamber and the tank effluent, a sludge receiving sump extending across the tank adjacent its influent and having a hopper at one end, a collector operatively associated with the sump for moving the sludge into the hopper, and an endless flight conveyor arranged in the tank so that its flights in the lower run will travel the length of the tank floor, passing beneath the said chamber, to collect the sludge and move it into the sludge sump and its flights in the upper run will travel along the surface of the liquid, passing up the inclined deck and over its associated scum trough, to collect and deliver the scum to the said troughs.

14. Apparatus for the treatment of industrial wastes or sewage comprising a sedimentation tank having an influent and an effluent, a chamber formed in the intermediate portion of the tank and having an open top terminating below the liquid level of the tank, said chamber being formed by a pair of spaced baffles adjustable in height and extending across the width of the tank, and a bottom wall elevated from the floor of the tank, means for aerating the wastes or sewage as they pass through the said chamber to effect separation of oil and grease, a scum receiving trough in each of the portions of the tank located on opposite sides of the aforesaid chamber, a sludge receiving sump in the tank adjacent its influent, an endless flight conveyor arranged in the tank so that its flights in the lower run will travel the length of the floor of the tank to collect the sludge and move it into the sludge sump and its flight in the upper run will travel along the surface of the liquid to collect and deliver the scum to the respective scum troughs, and a pipe connecting the two troughs for bringing together the scum from both of the said troughs.

15. Apparatus for the treatment of industrial wastes or sewage comprising a single, continuous, straight-line flow sedimentation tank having an influent at one end and an effluent at the other end, means for dividing the interior of the tank into an initial sedimentation compartment, an intermediate aeration compartment, and a final sedimentation compartment, means in the intermediate compartment for aerating the liquids passing therethrough to separate oil and grease therefrom, and means for collecting and removing scum and sludge from the initial and final compartments.

16. Apparatus for the treatment of industrial wastes or sewage comprising a sedimentation tank having an influent and an effluent, a chamber formed in the intermediate portion of the tank and having an open top terminating below the liquid level of the tank, said chamber being formed by a pair of spaced baffles extending across the width of the tank and a bottom wall elevated from the floor of the tank, means for aerating the wastes or sewage as they pass through the said chamber to effect separation of oil and grease, a scum receiving trough in the portion of the tank extending between the tank influent and the aforesaid chamber and having an inclined deck on its upstream side, a scum receiving trough in the portion of the tank extending between the aforesaid chamber and the tank effluent, a sludge receiving sump in the tank adjacent its influent, and an endless flight conveyor arranged in the tank so that its flights in the lower run will travel the length of the tank floor, passing beneath the said chamber, to collect the sludge and move it into the sludge sump and its flights in the upper run will travel along the surface of the liquid, passing up the inclined deck and over its associated scum trough, to collect and deliver the scum to the said troughs, said flights being of proper size and shape so that in passing beneath the aerating chamber they will prevent a short-circuiting flow of the liquid from one side to the other of said chamber.

BYRON K. HARTMAN.